US010757950B2

(12) United States Patent
Mercuri

(10) Patent No.: US 10,757,950 B2
(45) Date of Patent: Sep. 1, 2020

(54) ENCASING APPARATUS FOR COMBINED COLLAGEN AND TUBULAR NETTING ARRANGEMENTS

(71) Applicant: Merctech Pty Ltd, Holden Hill (AU)

(72) Inventor: Ennio Mercuri, Holden Hill (AU)

(73) Assignee: Merctech Pty Ltd, Holden Hill (AU)

( * ) Notice: Subject to any disclaimer, the term of this patent is extended or adjusted under 35 U.S.C. 154(b) by 322 days.

(21) Appl. No.: 15/535,197

(22) PCT Filed: Dec. 11, 2015

(86) PCT No.: PCT/AU2015/000748
§ 371 (c)(1),
(2) Date: Jun. 12, 2017

(87) PCT Pub. No.: WO2016/090415
PCT Pub. Date: Jun. 16, 2016

(65) Prior Publication Data
US 2017/0339966 A1    Nov. 30, 2017

(30) Foreign Application Priority Data

Dec. 11, 2014  (AU) ................................ 2014905018

(51) Int. Cl.
*A22C 11/00* (2006.01)
*A22C 11/02* (2006.01)
*A22C 13/00* (2006.01)

(52) U.S. Cl.
CPC ....... *A22C 11/0209* (2013.01); *A22C 11/0281* (2013.01); *A22C 2013/0053* (2013.01)

(58) Field of Classification Search
CPC ..... A22C 11/00; A22C 11/02; A22C 11/0209; A22C 11/0227; A22C 11/0245; A22C 11/0254; A22C 13/00; A22C 2013/0056
USPC ........... 452/21–26, 30–32, 35–37, 46–48, 51
See application file for complete search history.

(56) References Cited

U.S. PATENT DOCUMENTS

| 5,024,041 | A |   | 6/1991 | Urban et al. |
| 5,045,020 | A | * | 9/1991 | Neeff ................... A22C 13/023 452/21 |
| 5,888,130 | A | * | 3/1999 | Weinheimer ....... A22C 13/0009 452/30 |
| 5,980,374 | A |   | 11/1999 | Mercuri |
| 7,063,610 | B2 |   | 6/2006 | Mysker |
| 7,494,405 | B2 |   | 2/2009 | Arias Lopez |
| 7,537,514 | B2 |   | 5/2009 | Arias Lopez |
| 7,666,484 | B2 |   | 2/2010 | Arias Lopez |

(Continued)

OTHER PUBLICATIONS

International Search Report dated Mar. 16, 2016 in corresponding Application No. PCT/AU2015/000748; 4 pgs.

(Continued)

*Primary Examiner* — Richard T Price, Jr.
(74) *Attorney, Agent, or Firm* — Maier & Maier, PLLC

(57) ABSTRACT

An encasing apparatus for encasing meat products in a double casing including a combined film and a net is described. A casing tube is placed over a meat stuffing horn and is preloaded with a shirred film and net casing for double casing meat exiting the meat stuffing horn. To reduce the risk of tearing of the collagen as it is deshirred and stuffed, the casing tube is oversized with respect to the meat stuffing horn and has a first outer diameter within 10-20% of the diameter of the expanded collagen casing.

11 Claims, 8 Drawing Sheets

(56) References Cited

U.S. PATENT DOCUMENTS

| | | | |
|---|---|---|---|
| 7,753,763 B2 | 7/2010 | Arias Lopez | |
| 7,883,399 B2 | 2/2011 | Tallberg et al. | |
| 2005/0032470 A1* | 2/2005 | Lopez | A22C 13/00 |
| | | | 452/35 |
| 2006/0040602 A1* | 2/2006 | Stall | A22C 13/02 |
| | | | 452/35 |
| 2006/0234611 A1* | 10/2006 | Delius | A22C 13/0013 |
| | | | 452/32 |
| 2009/0075575 A1* | 3/2009 | Tallberg | A22C 13/0003 |
| | | | 452/21 |
| 2010/0255230 A1 | 10/2010 | Hihnala et al. | |

OTHER PUBLICATIONS

Netted Casing, Viewed on Internet on Feb. 17, 2016, URL: https://www.youtube.com/watch?v=_gOg-VNtwc, Published on Nov. 6, 2011.

\* cited by examiner

ENCASING APPARATUS FOR COMBINED COLLAGEN AND TUBULAR NETTING ARRANGEMENTS

PRIORITY DOCUMENTS

The present application claims priority from Australian Provisional Patent Application No. 2014905018 titled "AN ENCASING APPARATUS FOR COMBINED COLLAGEN AND TUBULAR NETTING ARRANGEMENTS" and filed on 11 Dec. 2014, the content of which is hereby incorporated by reference in its entirety.

TECHNICAL FIELD

The present invention relates to an apparatus for encasing meat products with a double film and netting casing.

BACKGROUND

Meat products, such as salamis, hams, poultry, turkeys and sausages are often encased in double casings comprising a film and a net. The encasing, or stuffing process comprises pushing the meat product through a meat stuffing horn and applying a double casing over the meat product. The meat product may be fresh or processed meat. The double casing comprises an inner film with an outer netting. The inner film layer is primarily used to contain the meat and give it a desired shape (eg sausage shape), as well as assisting to protect and preserve the meat, and may be edible or inedible, and made of synthetic or natural materials. The outer netting may be knitted, woven, extruded or otherwise manufactured and may be rigid or elastic, and typically applies compressive force on the meat to assist in curing and/or preservation of the meat (eg by forcing out any air), or to apply a surface pattern to the meat to give it a desirable appearance.

Typically the netting is stored and shipped in a loose unstretched form. In preparation for use, the netting is shined onto a casing tube so that the netting is arranged in tight folds on the casing tube. The diameter of the casing tube is slightly larger than the diameter of the meat stuffing horn so that the casing tube can be inserted over and supported by the meat stuffing horn. In use as the meat is extruded the net is pulled off the casing tube (de-shirred) so that it expands and encases the meat. Shining the net allows a large length of net to be loaded onto the fixed length casing tube. When the tube runs out of netting the stuffing machine must be stopped or paused whilst a new (preshirred) casing tube is loaded. Thus, the netting is typically tightly packed to maximise the time between stoppages. Typically shirring of the netting onto the casing tube is performed shortly (ie minutes or hours) before use to minimise the time (or duration) that the netting is kept in a stretched form prior to use, as storage of the netting in stretched configuration tends to reduce its performance in use around a meat product. The size of the tube is limited by the maximum diameter of the rigid netting, or maximum stretched diameter for elastic netting.

Shining arrangements are efficient for netting arrangements. However, some films, and in particular collagen films, are fragile and thus difficult to apply using shining arrangements. This creates problems with providing double casings, as rough treatment can lead to tearing of the collagen film as it is placed over the meat resulting in wastage of meat product.

One arrangement used to double case a meat product as it is extruded is to use a flat collagen film stored on a roll and a means for shaping and wrapping the film around the meat stuffing horn as the meat is extruded through the meat stuffing horn. Shined netting on a casing tube is placed over the meat stuffing horn and shaping and wrapping means, so that the wrapped meat is then encased with the netting to double case the meat product. The diameter of the collagen as the meat is extruded is similar to the diameter of the meat horn and thus the collagen is required to radially expand as it wraps and encases the meat. One method to facilitate this radial expansion is to introduce longitudinal folds or pleats in the collagen. As meat is extruded this pressure pushes the folds outward allowing radial expansion to an expanded diameter (ie the collagen has a reduced diameter on the horn or tube and expands to some nominal maximum diameter). However, one problem with the use of longitudinal folds is that collagen is delicate and can be sticky (especially when wet), and so that as the folds expand to increase the radius, the two sides of a fold can catch on each other preventing free expansion of the fold. In this case pressure mounts on the fold from the filling of meat, leading to tearing of the delicate collagen film. This creates wastage of the collagen, film, netting, meat, and operator time.

There is thus a need to provide an improved apparatus for encasing meat products in a double casing comprising a film and a net, or to at least to provide a useful alternative to current arrangements.

SUMMARY

According to a first aspect of the present invention, there is provided an encasing apparatus for encasing meat products extruded from a meat stuffing horn having a meat outlet end in a double casing comprising a film casing and a net casing, the encasing apparatus comprising:

a casing tube with a first outer diameter wherein in use a film casing and a net casing is shined onto the casing tube, and the shined casing tube is co-axially mounted over a meat stuffing horn having a meat outlet end, and the expanded film casing has a second diameter, and the ratio of the second diameter to the first outer diameter is between 1.05 and 1.35.

In one form, the ratio is between 1.1 and 1.25.

In one form, the casing tube has a first end and a casing outlet end and the encasing apparatus further comprises a mounting arrangement for co-axially mounting the casing tube over the meat stuffing horn, the mounting arrangement comprising:

a first annular spacer for supporting the casing tube from the meat stuffing tube at the first end of the casing tube, the first annular spacing comprising a support portion that supports and spaces the casing tube from the meat stuffing horn, and a stop portion extending radially from the support portion to act as a stop when inserting the casing tube over the meat stuffing horn; and a second annular spacer for supporting the casing tube from the meat stuffing tube at the casing outlet end of the casing tube.

In a further form, the second annular spacer further comprises an annular support portion and a tubular wall that in use extends from the annular support to the first annular spacer.

In a further form, the support portion of the first annular spacer supports the tubular wall of the second annular spacer, and the stop of the first annular spacer is configured to receive and engage the tubular wall.

In a further form, the first annular spacer further comprises a fastening arrangement to allow fastening of the casing tube to the first annular spacer.

In a further form, the first annular space comprises a threaded shaft extending through the stop portion and the fastening arrangement comprises a loop attached to the casing tube and a screw, and in use the screw is screwed into the threaded shaft to engage with the meat stuffing horn and fasten the spacer in place, and the loop is placed over a top portion of the screw extending above the first annular spacer to fasten the casing tube to the first annular spacer.

In a further form, the portion of the meat stuffing horn that receives the casing tube has a constant diameter.

In a further form, the film is a collagen film.

In a further form, the net casing rests on the film casing.

In a further form, the encasing apparatus further comprises the meat stuffing horn.

According to a second aspect of the present invention, there is provided a method of double casing a meat product exiting a meat stuffing horn, the method comprising:

inserting an annular casing tube having a first outer diameter loaded with a shined double casing comprising a film casing and a net casing over a meat stuffing horn;

forcing a meat product through the meat stuffing horn;

double casing the meat exiting the meat stuffing horn wherein the meat exiting the meat outlet end de-shins and expands the film and net casing;

wherein the expanded film casing has a second diameter, and the ratio of the second diameter to the first outer diameter is between 1.05 and 1.35.

In one form, the ratio is between 1.1 and 1.25.

In a further form, the film is a collagen film.

In a further form, inserting an annular casing tube comprises:

inserting a first annular spacer and a second annular spacer over a meat stuffing horn; inserting the annular casing tube over the first annular spacer and a second annular spacer until a first end of the annular casing tube engages a stop portion of the first annular spacer; and fastening the annular casing tube to the first annular spacer.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1A:
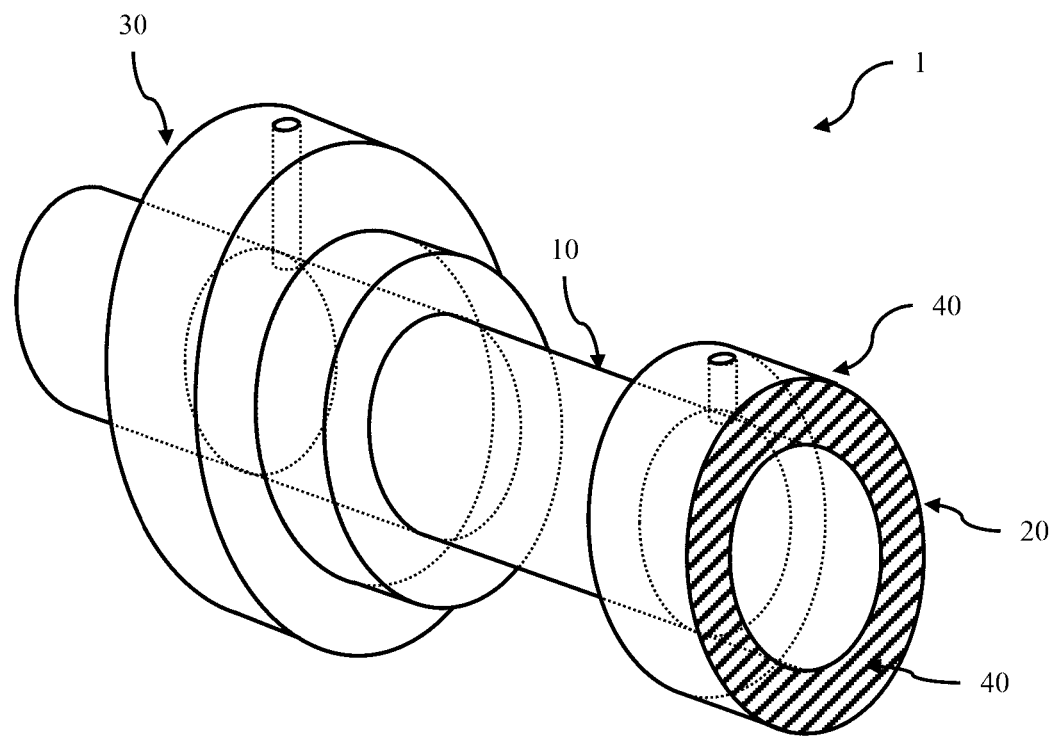
FIG. 1A is an isometric view of an encasing apparatus for encasing meat products in a double casing comprising a combined film and a net in an unloaded state according to an embodiment.
Figure 1B:
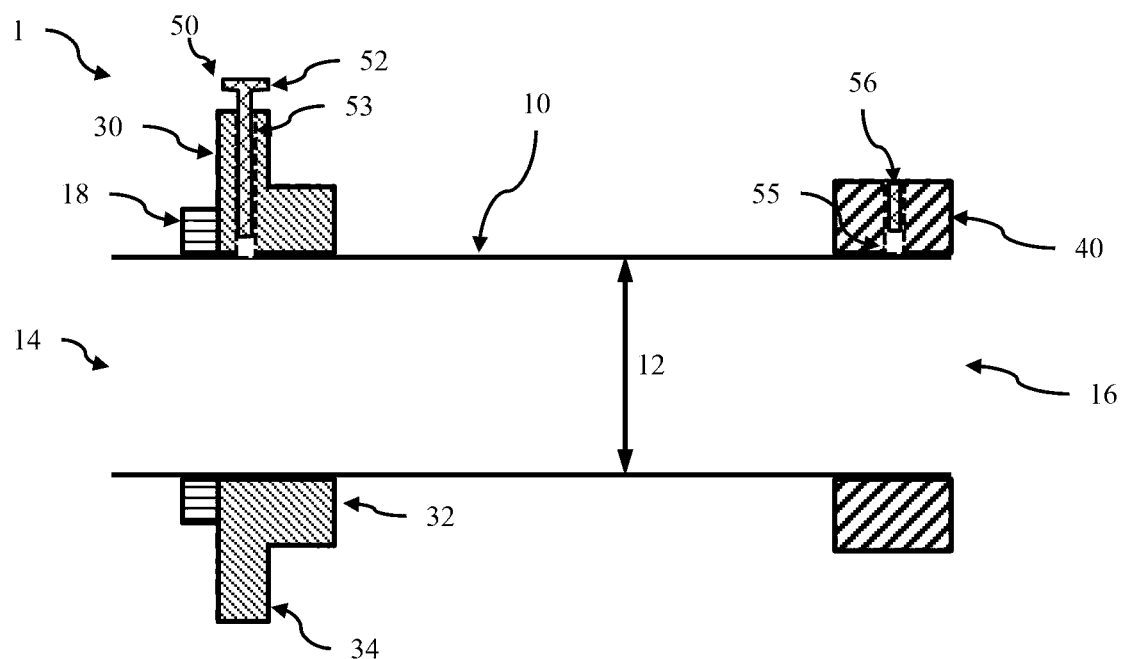
FIG. 1B is a side sectional view of the encasing apparatus of FIG. 1A according to an embodiment.
Figure 1C:
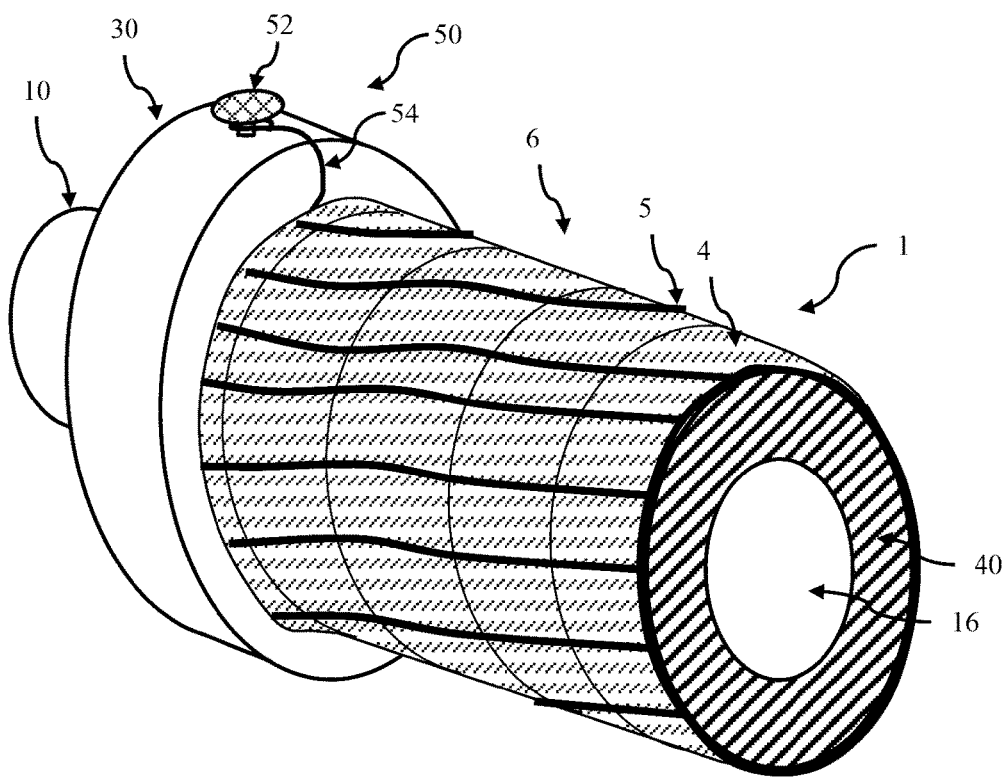
FIG. 1C is an isometric view of an encasing apparatus for encasing meat products in a double casing comprising a combined film and a net shown in a loaded state according to an embodiment.
Figure 1D:
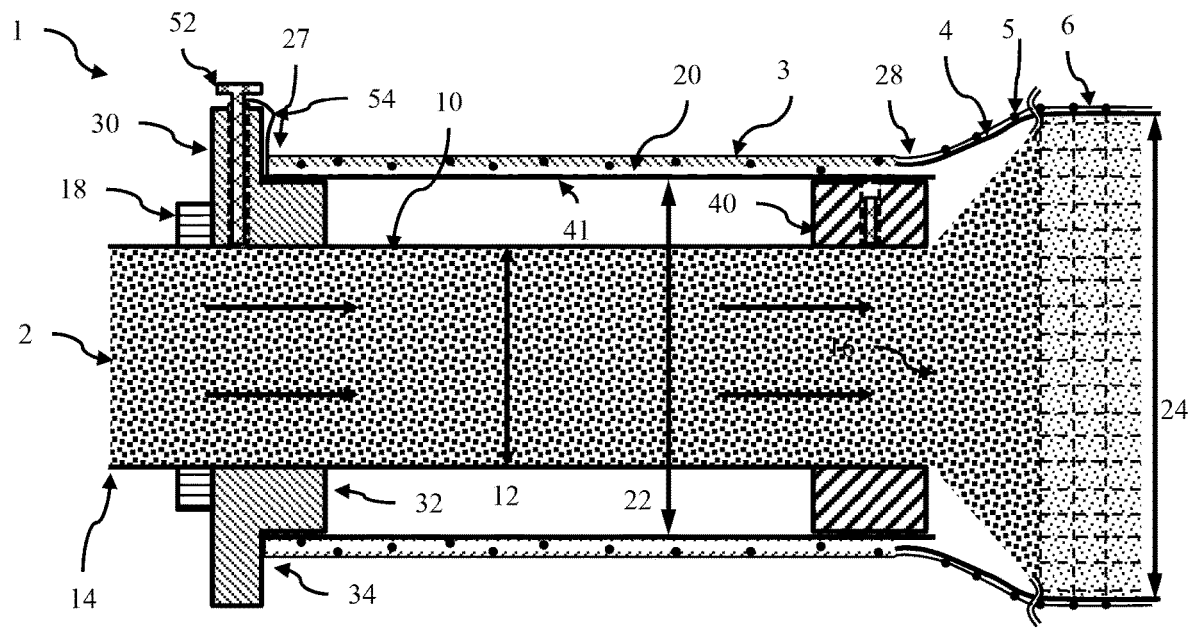
FIG. 1D is a side sectional view of the encasing apparatus of FIG. 1C in use according to an embodiment.
Figure 1E:
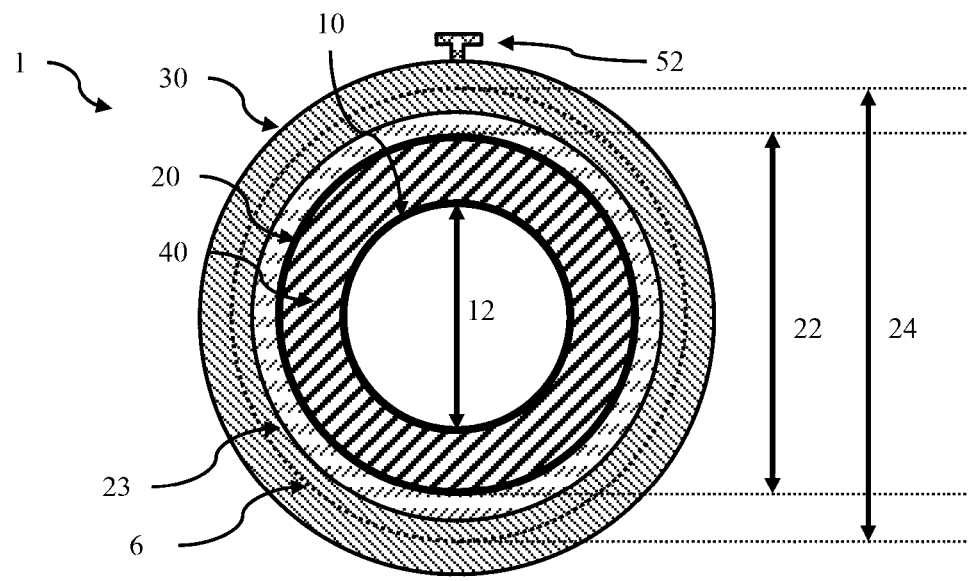
FIG. 1E is an end view of the encasing apparatus of FIG. 1C according to an embodiment.

Referring now to FIG. 1A, there is shown an isometric view of an encasing apparatus 1 for encasing meat products 2 in a double casing comprising a combined film 4 and a net 5 shown in an unloaded state according to an embodiment. FIG. 1B is a side sectional view of the apparatus shown in FIG. 1A. FIG. 1C is an isometric view of the encasing apparatus 1 of FIG. 1A loaded with a shined combined film 4 and a net 5. FIG. 1D is a side sectional view of the loaded encasing apparatus of FIG. 1C in use, and FIG. 1E is an end view of the loaded encasing apparatus of FIG. 1C. FIGS. 2A to 2F illustrate the steps in assembling and using the encasing apparatus shown in FIGS. 1A to 1E.

The encasing apparatus can be used to encase a meat product in a double casing. In this embodiment, the double casing is a film casing and a net casing, in which the net casing rests or sits on top of the film casing. The net casing may also be referred to more generally as netting and will typically comprise large open gaps between circumferential and longitudinal threads, allowing the meat and film casing to bulge outward to create a surface pattern. This can be achieved by co-shining collagen and netting onto a casing tube; however, other arrangements could be used such as first shining the film casing onto the casing tube, and then shirring the net casing over the top of the shined film casing. In other embodiments, the net could be attached (eg woven) to the film at a plurality of points along and around the film. For the sake of convenience the various embodiments will be collectively referred to as a combined film and net casings. The combined film and net on the casing tube can then be placed over a meat stuffing horn to double case the meat product. The net may be a rigid net or an elastic net. Similarly, the film may be a collagen film or some other film including edible and non-edible films. In the embodiment discussed in detail below, the film is a collagen film and the net is an elastic net, but it is to be understood that this is an example embodiment, and other types of films and nets could be used.

In this embodiment, the encasing apparatus 1 comprises a meat stuffing horn 10 and a casing tube 20 supported by a first annular spacer 30 and a second annular spacing 40. The meat stuffing horn has a diameter 12 and comprises a first end 14 through which meat is stuffed or pushed, and a meat outlet end 16. Additionally, a tube end locating element 18, which in this case is a flange provided on the exterior of the meat stuffing tube to act as a stop. However, in other embodiments the tube end locating element could be a guard or shield, or simply be a mark, line or etching on the tube to indicate the location or point along the tube that the first end 14 should be located at. In this embodiment, the meat stuffing horn has a constant diameter 12 from the flange 18 to the meat outlet end 16.

A casing tube 20 with a diameter 22 is co-axially mounted over the meat stuffing horn 10 and has a first end 27 and a casing outlet end 28. In use the casing tube stores a shirred combined film and net 3 comprised of an elastic net 5 resting on a collagen based film 4. Extrusion of meat product 2 from the meat outlet end 16 of the meat stuffing horn 10 pulls off (and de-shins) the combined film and net. As shown in FIG. 1D, the extruded meat forces expansion of the combined collagen casing and netting to an expanded size (or diameter) of the collagen 24 to double case the meat product (ie the meat exiting the meat outlet end de-shins and expands the film and net casing). This expanded size is the size of the resultant meat product, and may be the maximum diameter of the netting or collagen, or alternatively an effective maximum based on the combined strength and elasticity of the combined collagen and netting. Shirring of the film and netting onto the casing tube is performed before the casing tube is loaded onto the encasing apparatus 1. This may be immediately before use, or the combined film and net may be loaded on the casing tube ahead of time, and then shipped and/or stored for later use. The diameter of the casing tube 22 is larger than commonly used casing tubes diameters and is selected to be close to the expanded or nominal maximum stretched diameter of the collagen film (typically the diameter of the resultant encased meat product)—see FIGS. 1D and 1E. By careful selection of the casing tube diameter, this reduces the stress on the collagen as it fully expands around the meat so reduces the risk of tearing that can occur using collagen with longitudinal folds where large expansion can cause folds to catch and tear. Due to the larger than normal size of the casing tube, the height or thickness of the shining is typically small (eg 5-10 mm thick).

A mounting arrangement is used to co-axially mount the casing tube 20 over the meat stuffing horn 10 and comprises a first annular spacer 30 for supporting and spacing the casing tube 20 from the meat stuffing tube 10 at the first end of the casing tube 27, and a second annular spacer 40 for supporting and spacing the casing tube 20 from the meat stuffing tube at the casing outlet end 28 of the casing tube 20.

In this embodiment, the first annular spacer 30 has an L shaped profile and comprises a support portion 32 that supports and spaces the casing tube 20 from the meat stuffing horn 10, and a stop portion 34 extending radially from the support portion 32 to act as a stop when the casing tube is inserted over the meat stuffing horn. The second annular spacer comprises an annular support portion and in use the casing tube 20 is supported by the first support portion 30 and the second annular support portion 40.

A fastening arrangement 50 is used to allow fastening of the casing tube 20 to the first annular spacer 30. In this embodiment, the fastening arrangement comprises a T shaped fastener 52, such as a pin or screw, radially extending out of a first shaft 53 in the annular spacer 30, and a loop 54 attached to or near the first end 7 of the casing tube 20 for looping over the T shaped fastener 52. In this embodiment, the fastening arrangement 50 is further adapted to secure the first annular spacer 30 to the meat stuffing horn 10. The first shaft 53 is a partially threaded radial shaft through the annular spacer, and the T shaped fastener 52 comprise a matching threaded shaft portion so that the fastener can be screwed into, or at least frictionally engage the tube 20 and thus secure the first annular spacer in place around the tube 20. A similar arrangement is provided in the second annular spacer comprising a second shaft 55 and a second fastener 56. In this embodiment as the shaft is located below the tube 20, the height of the fastener is selected so that when fastened to the tube, the fastener is fully recessed within the shaft.

In other embodiments multiple (eg 2, 3 or 4) shafts and screws could be provided to assist in fastening the first and second annular spacers to the tube at a desired location. These fastening arrangements allow the spacers to be located at any desired location along the meat stuffing horn and then fastened in place. The meat stuffing horn may comprise one or more location indicators or locating arrangements to facilitate fastening at desired locations. For example, an outer shoulder could be placed in the meat outlet end of the meat stuffing horn, and the lower edge of the second annular spacer could comprise of a projection which engages with the shoulder so that the shoulder acts a stop against further insertion of the second annular spacer 40. Alternatively, a mark could be placed or etched on the tube or a recess could be provided in the outer surface of the meat stuffing horn to receive the fastener (which in this case could be a pin).

In this embodiment the combined double casing is a collagen based film covered by an elastic net. The combined collagen casing and net are tightly shirred together and loaded onto the casing tube. Collagen based film casings are typically fragile and difficult to work with as collagen casings easily tear if they are subjected to excessive stress or force in the de-shining and expansion process as they are extracted from the casing tube 20. Tearing of the collagen casing is undesirable as it results in wastage of the meat, casing, netting and operator time. Advantageously, it has been found that using embodiments described herein in which the encasing tube has a significantly larger diameter than the meat stuffing horn so that the collagen is stretched closer to its maximum stretched diameter the risk of tearing of the collagen film as it is stuffed is reduced. We define the outer diameter of the casing tube 22 as a first outer diameter and the expanded diameter of the collagen film 24 as the second diameter. The expanded diameter of the collagen film casing can be determined by blowing up the collagen film casing with compressed air (to force expansion) and then measuring the diameter. In some embodiment the expanded diameter of the casing may be less than the diameter of the meat product. That is the maximum expanded diameter may be less than the actual diameter of a meat product. In some embodiments the expanded diameter of the collagen film will also be the diameter of the encased meat product as in some cases the netting will allow more expansion than the casing so that the expanded diameter of the casing (ie the second diameter) is the limiting factor on the diameter of the encased meat product. However, in some cases the diameter of the encased meat product may be less than the expanded diameter of the collagen casing. This may occur if the maximum diameter of the netting is less than the expanded diameter of the casing, or if the interaction of the casing and netting during filling and expansion limits expansion to the expanded diameter of the collagen film, or due to some other factor such as the rate the meat is extruded.

Table 1 below shows the results of testing two embodiments with different tube diameters and expanded casing diameters that were successfully trialled. We can define a ratio of the expanded diameter of the collagen film to the outer diameter of the casing tube, that is, the ratio of the second diameter to the first outer diameter. As indicated above, the expanded diameter of the collagen casing was obtained by blowing up the casing with compressed air and measuring the diameter. As shown in Table 1, successful results were achieved with actual ratios of 1.1 and 1.23. A trial using collagen film with an expanded diameter of 84.5 mm on a tube with an outer diameter of 83 mm—a ratio of 1.02 (or 98%) failed. For reference, in the first case with an expanded diameter of 102 mm, the casing flat width was 150 mm, the netting flat width was 105 mm, and in the second case with an expanded diameter of 119 mm, the casing flat width was 180 mm, the netting flat width was 115 mm.

TABLE 1

Example collagen film and casing tube diameters and ratios that were successfully trialled. The expanded diameter of the collagen film was obtained by blowing up the casing with compressed air and measuring the diameter.

| Expanded Diameter of Collagen Film (24) Second Diameter | Outer Diameter of Casing Tube (22) First outer diameter | Ratio of Diameter of Expanded Collagen Film to Diameter of Casing Tube ($2^{nd}:1^{st}$) |
|---|---|---|
| 119 mm | 108 mm | 1.10 |
| 102 mm | 83 mm | 1.23 |

Based on these trials it is estimated that an acceptable range for the ratio of the expanded diameter of the collagen film to the outer diameter of the casing tube, that is the ratio of the second diameter to the first outer diameter, of between 1.05 and 1.35. Preferably the ratio is between 1.1 and 1.25. The ratios described herein have been found to facilitate double casing meat products using collagen based casings through reduced stresses and risk of tearing of the collagen casing as it expands to its final diameter driven by the extruded meat, thus reducing wastage. Thus given an outer diameter of the casing tube, the range of collagen films (and equivalently the meat product diameters) that the casing tube can be used for, can be calculated by multiplying the casing diameter by a suitable ratio in this range. It will also be understood that the ratio can be reversed so it is a ratio of casing tube to expanded diameter. Thus if a desired expanded diameter of collagen is specified, or the desired diameter of the meat product is specified (assuming the limiting factor is the diameter of the expanded collagen) then the required outer diameter of the casing tube can be calculated using the inverted ratio. For example inverting the above ratios (ie 1/1.35 to 1/1.05) generates an equivalent range for the outer diameter of the casing tube to the expanded casing diameter (or desired meat product diameter) of between 74% to 95%. Preferably this range is between 80% to 91% (1/1.25 to 1/1.1).

For example in one embodiment, the meat stuffing horn has a diameter of 48.6 mm. This can be used with several different diameter casing tubes and films through the use of appropriately dimensioned spacers. In one embodiment the casing tube has a length is 594 mm (23.4") and an inner diameter of 104.65 mm (4.12") with a wall thickness of 1.5 mm (0.06") giving an outer diameter of 107.65 mm. The combined film and netting casing has an expanded diameter of 125 mm—and hence an expanded film and net to casing tube ratio of 1.16 (125/107.65)—that is the expanded casing is about 16% larger. Equivalently the ratio of the tube to the expanded film and net casing is 0.86 (107.65/125)—that is the tube diameter is about 86% of the expanded casing diameter. The first and second spacers for this embodiment both have inner diameters of 48.6 mm, outer diameters of 102.9 mm, and lengths of 70 mm. The diameter of the stop portion of the first spacer is 113 mm and the shaft 53 is configured to receive a M8×1.25 mm thread screw. In another embodiment, the combined film and netting has an expanded diameter of 105 mm and the casing tube has an outer diameter of 90 mm (3.5")—a ratio of 1.17. In this embodiment thickness of the tube is 1.5 mm (inner diameter 87 mm) and the first and second spacers both have inner diameters of 48.6 mm, outer diameters of 86.7 mm, and lengths of 70 mm. The diameter of the stop portion of the first spacer is 110 mm and the shaft 53 is configured to receive a M8×1.25 mm thread screw. In another embodiment the combined film and netting has an expanded diameter of 90 mm and the casing tube has an outer diameter of 81.28 mm (3.2")—a ratio of1.11. In this embodiment the casing tube has a length of 610 mm (24"), an inner diameter of 78.74 (3") and a wall thickness of 2.5 mm (0.1"). The first and second spacers both have inner diameters of 48.6 mm, outer diameters of 77.9 mm, and lengths of 70 mm. The diameter of the stop portion of the first spacer is 100 mm and the shaft 53 is configured to receive a M8×1.25 mm thread screw.

Figure 2A:
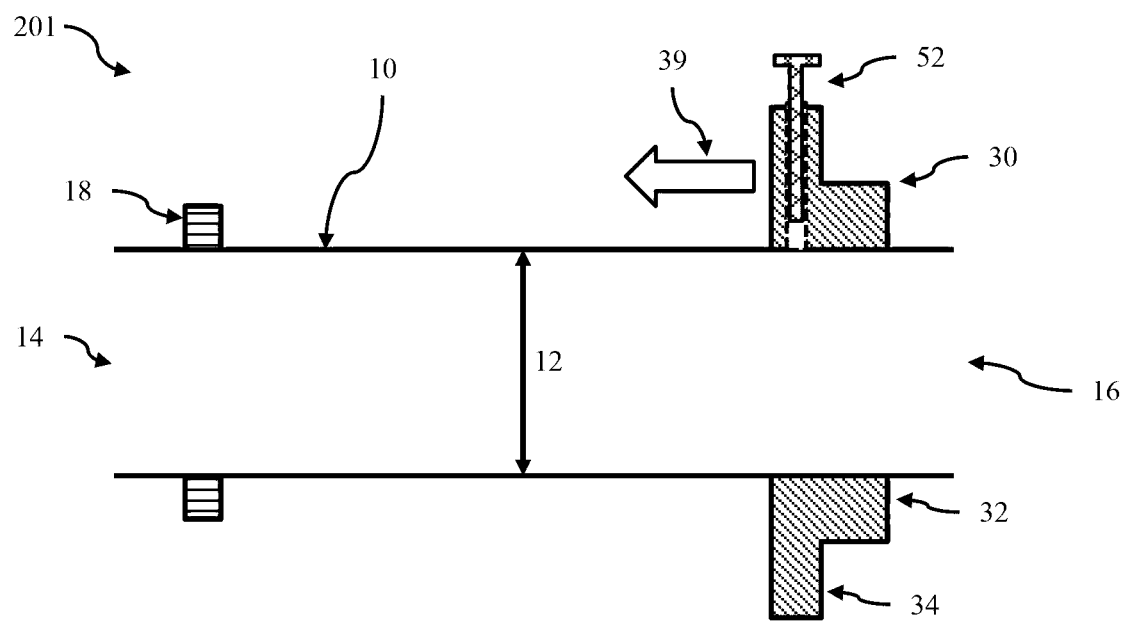
FIG. 2A is a side sectional view of a first annular spacer being placed over a meat stuffing horn according to an embodiment.
Figure 2B:
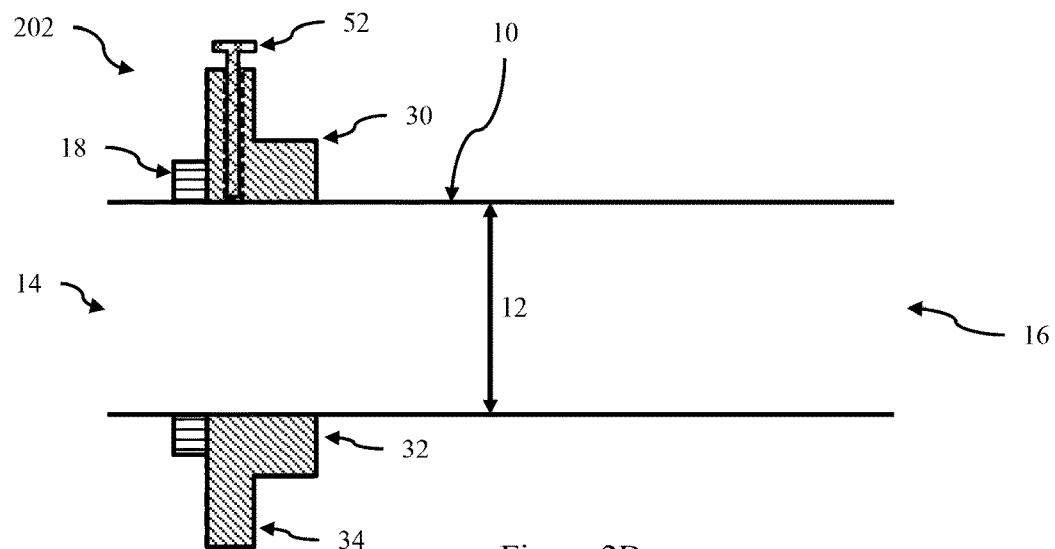
FIG. 2B is a side sectional view of the first annular spacer in place over the meat stuffing horn shown in FIG. 2A according to an embodiment.
Figure 2C:
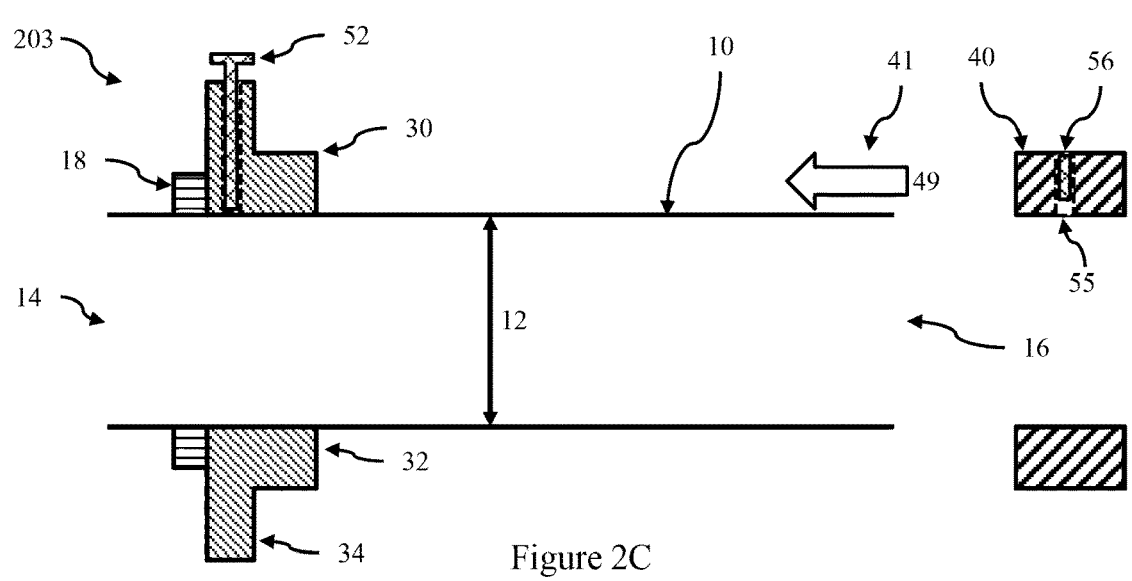
FIG. 2C is a side sectional view of a second annular spacer being placed over the meat stuffing horn of FIG. 2A according to an embodiment.
Figure 2D:
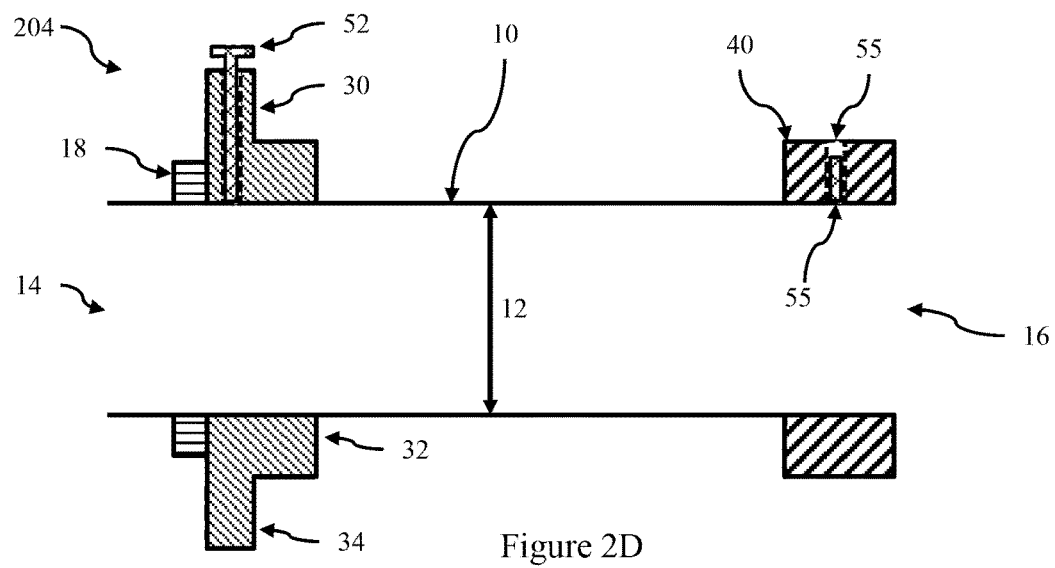
FIG. 2D is a side sectional view of the second annular spacer in place over the meat stuffing horn shown in FIG. 2A according to an embodiment.

FIGS. 2A to 2F illustrate the assembly process for the embodiment illustrated in FIG. 1A to 1E. FIG. 2A is a side sectional view of a first annular spacer 40 being placed over the meat stuffing horn 10 by pushing the spacer toward the flange 18 as indicated by direction arrow 39. The T shaped fastener 52 is a screw which has been screwed out of the shaft 53 to allow the spacer to slide along the meat stuffing horn 10. FIG. 2B shows the first annular spacer 30 in place (abutting the flange 18) over the meat stuffing horn 10. The screw 52 has been screwed into the shaft 53 to fasten the spacer 30 to the meat stuffing horn 10. Next FIG. 2C shows the second annular spacer 40 being placed (inserted) over the meat stuffing horn 10 as indicated by direction arrow 49. The second fastener 56 is screwed out of the shaft 55 to allow the spacer to slide along the meat stuffing horn 10. FIG. 2D shows the second annular spacer 40 in place over the meat outlet end 16 of the meat stuffing horn 10 and secured to the meat stuffing horn by screwing the second fastener in to engage the meat stuffing horn 10. The loop 54 of the fastening arrangement 50 is placed over screw 52.

Figure 2E:
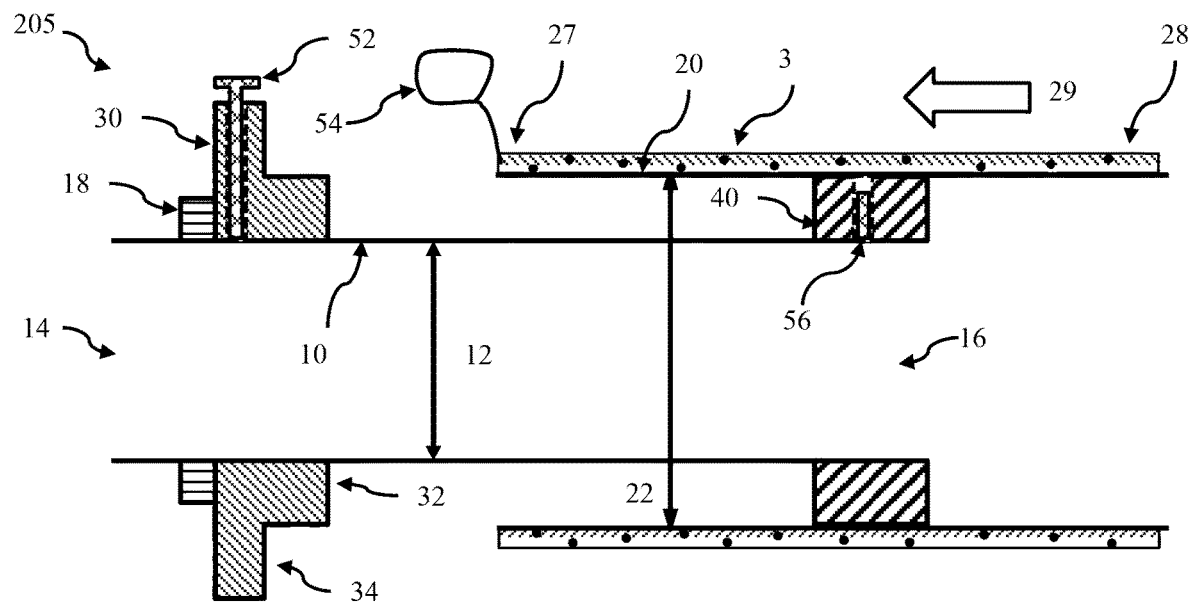
FIG. 2E is a side sectional view of a casing tube loaded with a shined combined film and net being placed over the meat stuffing horn and annular spacers of FIGS. 2A and 2C according to an embodiment.
Figure 2F:
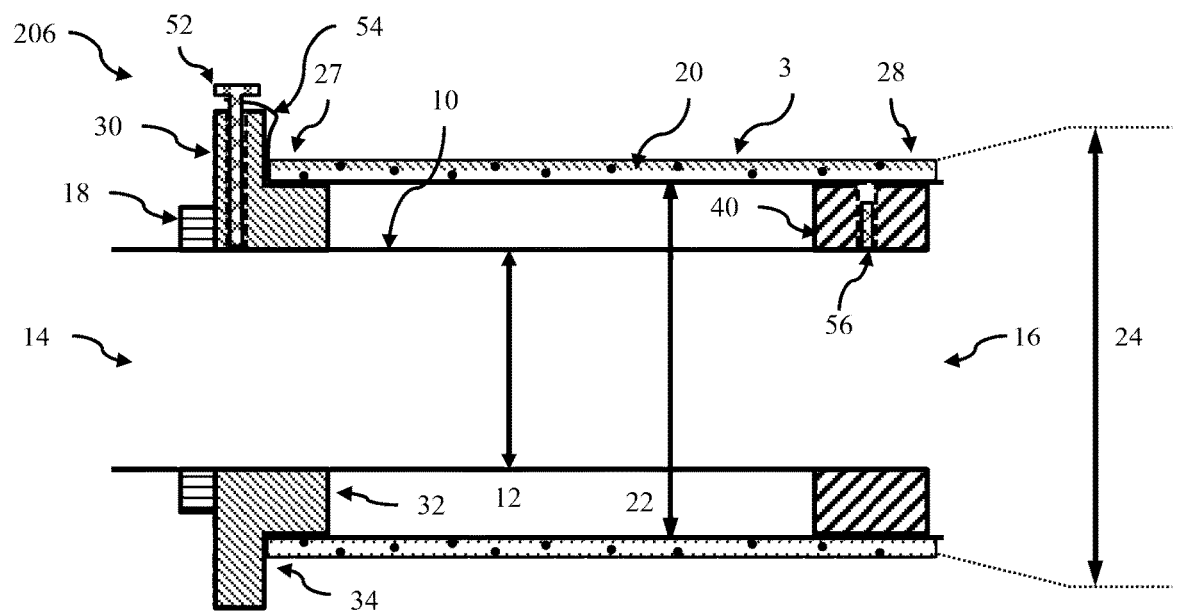
FIG. 2F is a side sectional view of the casing tube in place over the spacing arrangement shown in FIGS. 2A to 2E according to an embodiment.

As shown in FIG. 2E, once the first and second annular spacers are in place, a pre-shirred combined film and net casing tube 20 is placed (inserted) over the meat stuffing horn 10 and annular spacers 30, 40 and inserted as indicated by direction arrow 29 until the casing tube engages the stop portion 34 of the first annular spacer 30. A loop 54 is connected to the first end 27 of the casing tube 20 and once the casing tube is in place, the loop is placed around the shaft of the T shaped fastener 52 to fasten the tube in place over the spacers 30, 40 and meat stuffing horn 10. FIG. 2F is a side sectional view of the assembled encasing apparatus shown in FIGS. 2A to 2E. In use meat product 2 are forced through the meat stuffing tube 10 and exit out the meat outlet end 16. This also pulls off the shirred casing from the casing tube 20 which then encases the meat product 2 with the film 4 and net 5 to form a double casing 6 as illustrated in FIG. 1D.

Figure 4:
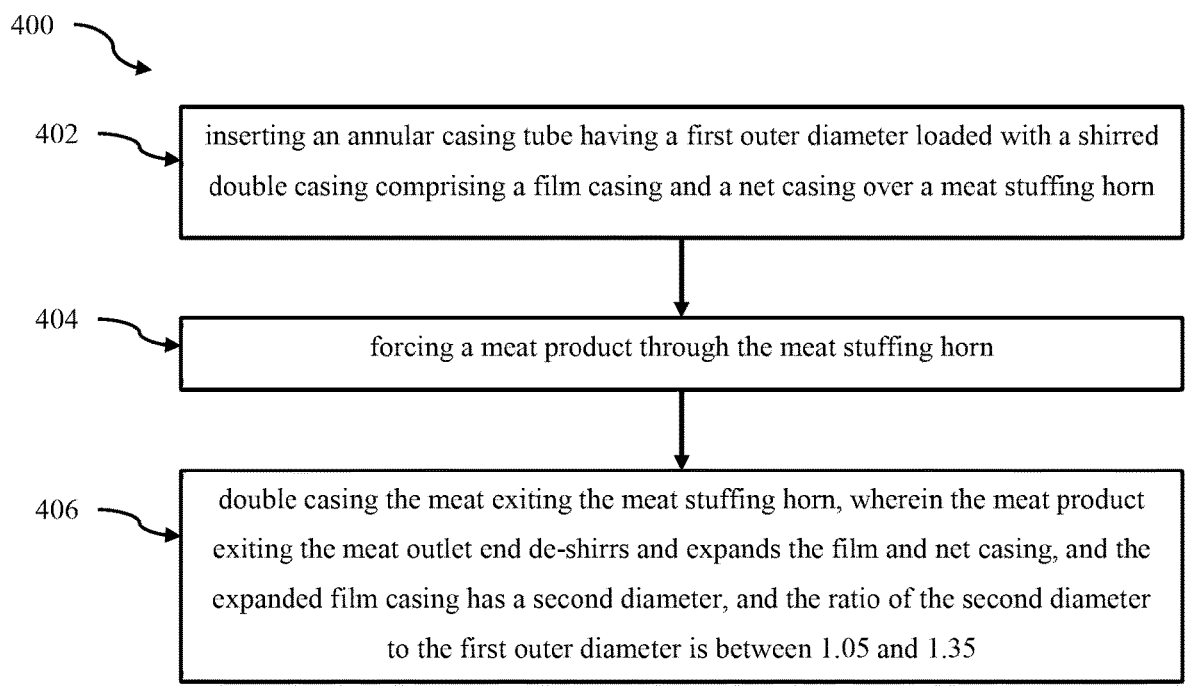
FIG. 4 is a flowchart of a method for double casing a meat product exiting a meat stuffing horn.

More generally FIG. 4 is a flowchart of a method of double casing a meat product exiting a meat stuffing horn 400. The method comprises the steps of:

inserting an annular casing tube 20 having a first outer diameter 22 loaded with a shined double casing 3 comprising a film casing 4 and a net casing 5 over a meat stuffing horn (step 402);

forcing a meat product 3 through the meat stuffing horn 10 (step 404);

double casing 6 the meat product 3 exiting the meat stuffing horn 10 using un-shined double casing 6 exiting the annular casing tube 20 (step 406) wherein the meat product 3 exiting the meat outlet end 16 de-shins and expands the film and net casing 6; and the expanded film casing 4 has a second diameter 24, and the ratio of the second diameter 24 to the first outer diameter 22 is between 1.05 and 1.35.

The method may further comprise:

inserting a first annular spacer 30 and a second annular spacer 40 over a meat stuffing horn 10 having a first outer diameter 12;

inserting the annular casing tube 20 over the first annular spacer 30 and a second annular spacer 40 until a first end of the annular casing tube 27 engages a stop portion 34 of the first annular spacer 30; and fastening the annular casing tube 20 to the first annular spacer 30.

Figure 3A:
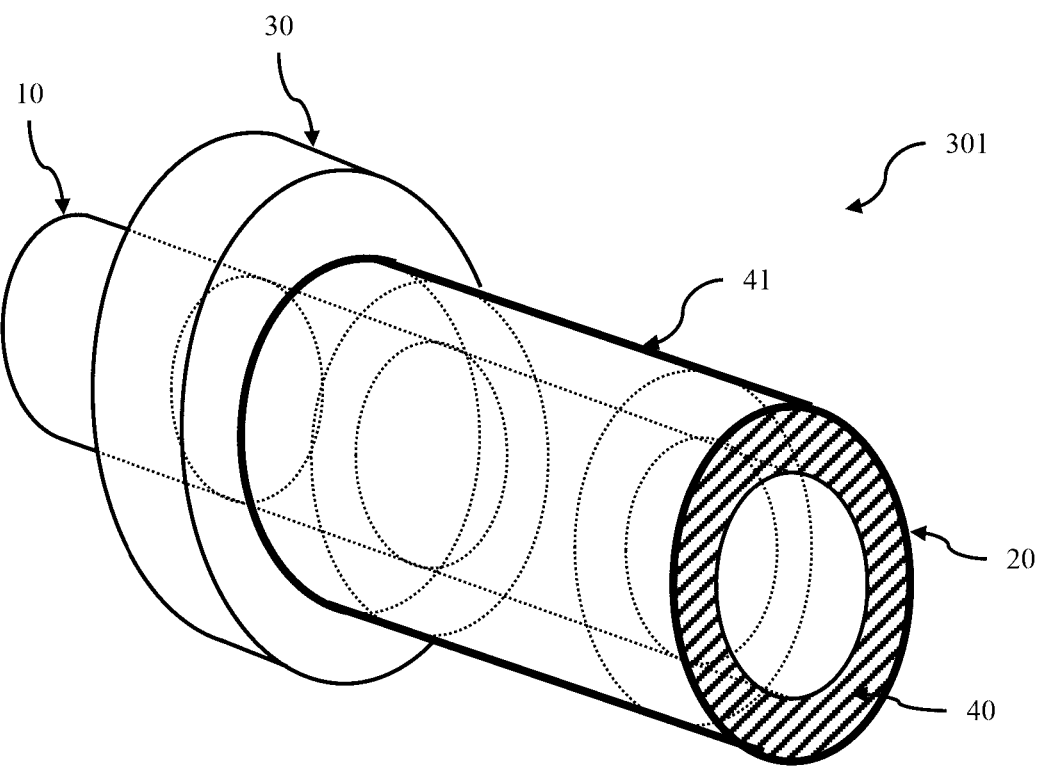
FIG. 3A is an isometric view of an encasing apparatus according to another embodiment.
Figure 3B:
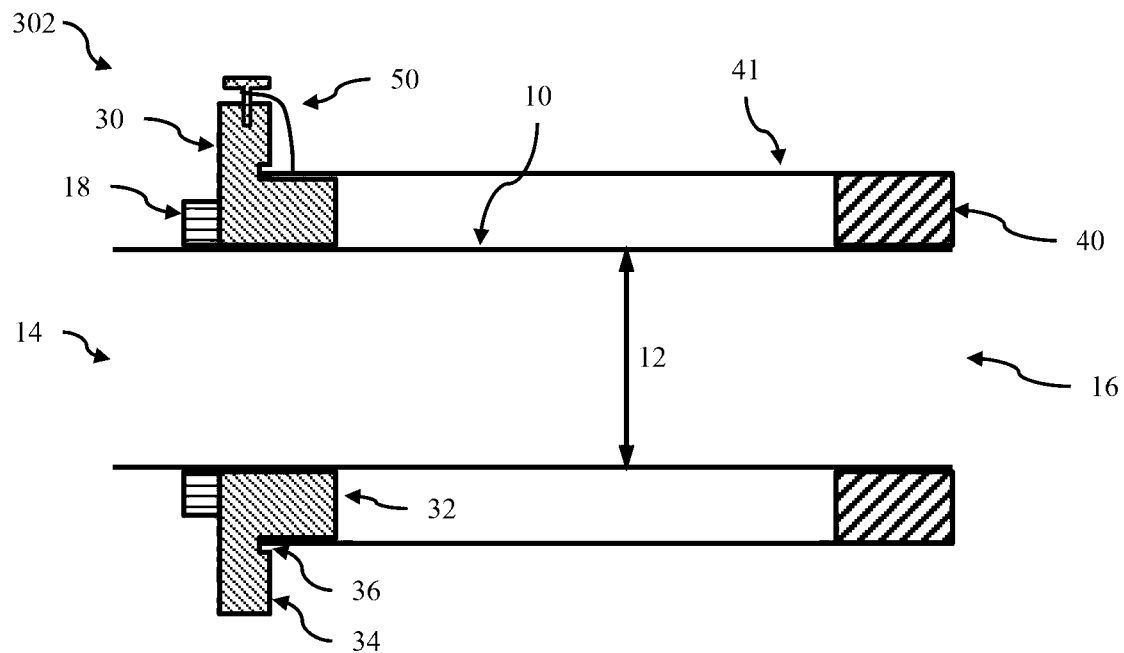
FIG. 3B is a side sectional view of an encasing apparatus according to another embodiment.
Figure 3C:
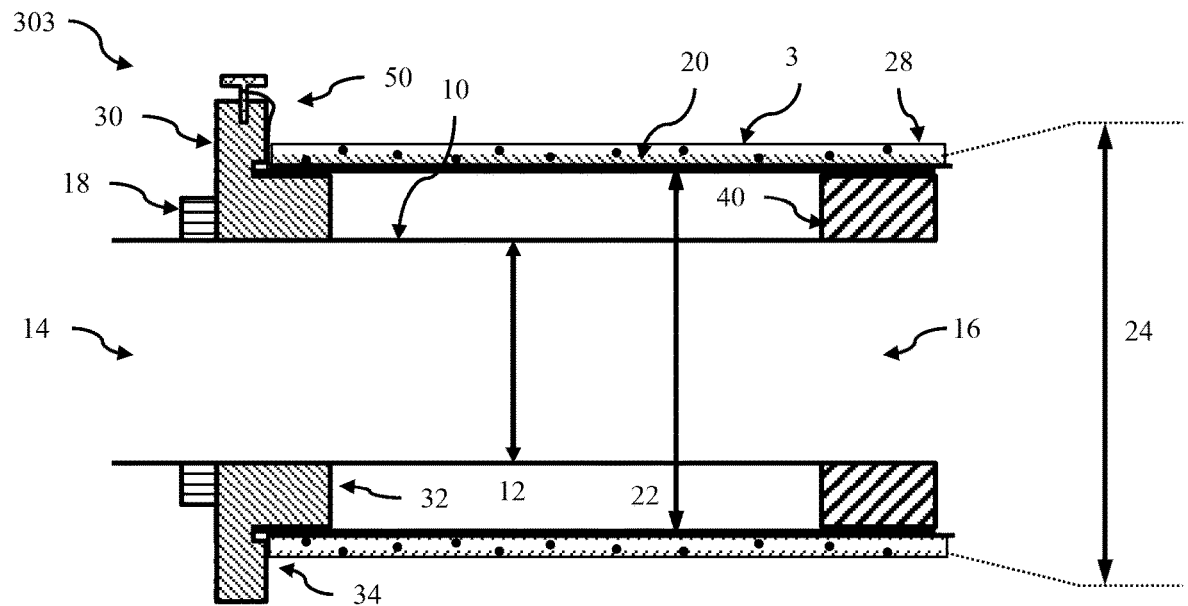
FIG. 3C is a side sectional view of an encasing apparatus loaded with a shined combined film and net on a tube according to another embodiment.

Various other embodiments can also be used. As outline above the casing tube is designed to have a diameter close to the expanded diameter of the combined collagen and netting casing (eg 10-20% smaller), and thus the casing tube is of a larger diameter than the meat stuffing horn (as casing tubes are normally designed to sit directly over the meat stuffing horn. In the above embodiment, two spacers are used to support the larger than normal casing tube. However, other support arrangements are possible. FIGS. 3A to 3C show an arrangement in which the spacers comprise and annular wall that provides additional support to the tube. FIG. 3A is an isometric view 301 and FIG. 3B is a side sectional view 302 of another embodiment of the encasing apparatus in which the second annular spacer comprises an annular support portion and a tubular wall 41. In use this annular wall 41 extends from the annular support to the first annular spacer 30. In this embodiment the stop portion of the first annular spacer 30 further includes a recess 36 sized to receive the end of the annular wall 41. FIG. 3C is a side sectional view 303 illustrating the annular wall 41 extending between the first support portion 30 and the second annular support portion 40 supporting the casing tube 20. In another embodiment a single annular spacer is used to support the casing tube 20. In other embodiments the annular spacers may be incorporated into the meat stuffing horn or they may be permanently fixed in place, such as by welding. Alternatively, the horn and casing tube could be integrated into a single unit which is fitted to a meat stuffing apparatus.

Further the ability to store and ship a casing tube pre-loaded with a combined shirred film and net casing allows use with a wide range of equipment and/or products. For example, the same loaded casing tube could be used with different apparatus having different length and/or different diameter meat stuffing horns. In the case of the different length horns, the same spacers can be used and only the location of the spacers needs to be modified. In the case of a different diameter horn, then spacing with different internal diameters are required, or spacer with a variable internal diameter could be used. For example a retractable inner wall or supports could be used. In the embodiments illustrated the spacers are solid annular spacers, but other arrangements could be used. In one embodiment, the spacers need not be solid but composed of support members linked to support the casing tube. For example, a hub and spoke arrangement could be used in which the hub sits on the stuffing horn and the spokes support the casing tube, or a rim and spoke arrangement could be used in which the rim supports the casing tube and the spokes extend down to the meat stuffing horn to support the rim. In another embodiment the spacer need not span 360° (ie not have a circular profile) and instead only span a smaller amount sufficient to support the casing tube such as 270°, 235°, 180° or even less if multiple spacers are used and offset with respect to each other to provide sufficient support to the casing tube.

Figure 3D:
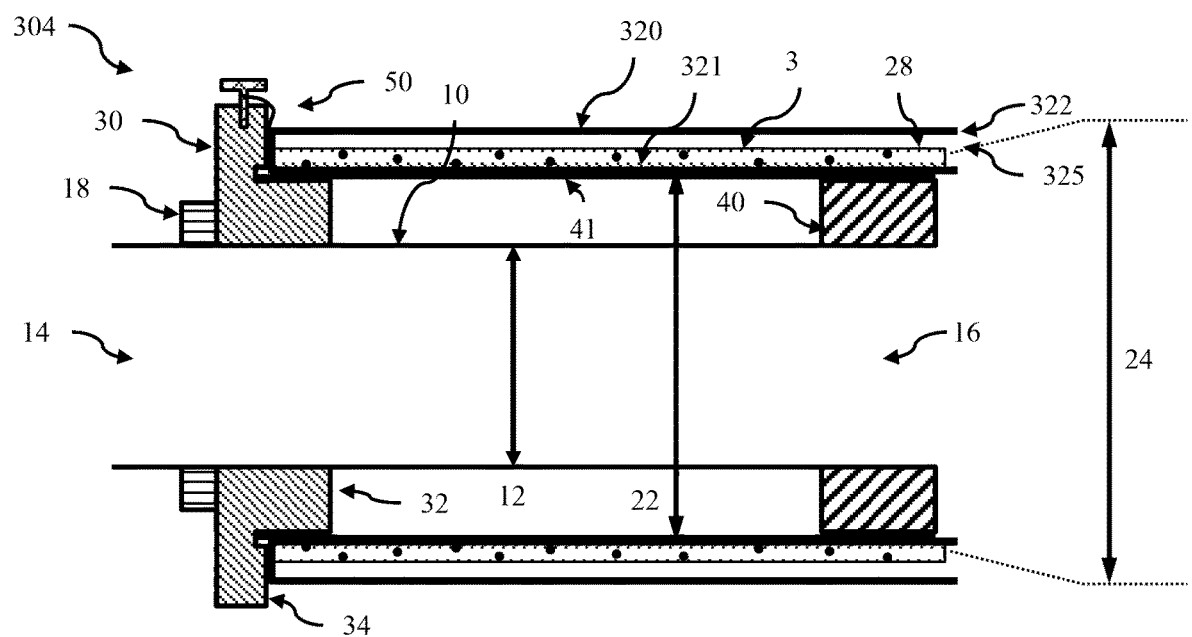
FIG. 3D is a side sectional view of an encasing apparatus loaded with a shined combined film and net in an double walled tube according to another embodiment.

Other variations are also possible. FIG. 3D is a side sectional view 304 of another embodiment of the encasing apparatus in which the casing tube 20 is a doubled walled tube 320 with an inner wall 321, and outer wall 322 and an annular space 325 between the inner wall 321 and outer wall 322 which in use receives the shirred combined film and net casing 3. The use of a double walled tube (ie an annular tube) protects the shirred combined film and net casing 3 during storage (after shirring).

Using the above embodiments, or similar variations, meat products can be double cased using a combined shirred collagen film and netting loaded onto a tube arrangement. By careful selection of the ratio of the diameter of the casing tube to the diameter of the expanded film, double casing of meat products using delicate casings, such as collagen based casings can be achieved that do not subject the combined film to excessive stress during expansion of the casing and thus assists in reducing wastage. Using an oversized casing tube in which the ratio of the expanded diameter of the collagen film to the outer diameter of the casing tube is between about 1.05 and 1.35 (ie expanded diameter is 5-35% larger than tube diameter), or equivalently the casing diameter is 74-95% of the expanded diameter enables efficient production of double cased meat products using conventional meat casing apparatus. Preferably the ratio of the expanded diameter of the collagen film to the outer diameter of the casing tube is between about 1.1 and 1.25 (ie expanded diameter is 10-25% larger than tube diameter), or equivalently the casing diameter is 80-91% of the expanded diameter. Use of apparatus with ratios in these ranges avoid the need to use longitudinal folds in the collagen film to allow radial expansion from the meat stuffing horn during the meat stuffing process which are prone to catching on themselves and thus tearing as pressure mounts from the meat filling. In particular by carefully choosing the ratio of the diameter of the encasing tube to the diameter of the collagen, the risk of tearing is reduced. Further this method can be used for a variety of film diameters allowing use on a wide range of products.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. An encasing apparatus for encasing meat products extruded from a meat stuffing horn having a meat outlet end in a double casing comprising a film casing and a net casing, the encasing apparatus comprising:
   a casing tube with a first outer diameter wherein in use a film casing and a net casing is shirred onto the casing tube, and the shined casing tube is co-axially mounted over a meat stuffing horn having a meat outlet end, and the expanded film casing has a second diameter, and the ratio of the second diameter to the first outer diameter is between 1.05 and 1.35.

2. The encasing apparatus as claimed in claim 1, wherein the ratio is between 1.1 and 1.25.

3. The encasing apparatus as claimed in claim 1, wherein the casing tube has a first end and a casing outlet end and the encasing apparatus further comprises a mounting arrangement for co-axially mounting the casing tube over the meat stuffing horn, the mounting arrangement comprising:
   a first annular spacer for supporting the casing tube from the meat stuffing tube at the first end of the casing tube, the first annular spacing comprising a support portion that supports and spaces the casing tube from the meat stuffing horn, and a stop portion extending radially from the support portion to act as a stop when inserting the casing tube over the meat stuffing horn; and
   a second annular spacer for supporting the casing tube from the meat stuffing tube at the casing outlet end of the casing tube.

4. The encasing apparatus as claimed in claim 3, wherein the second annular spacer further comprises an annular support portion and a tubular wall that in use extends from the annular support to the first annular spacer.

5. The encasing apparatus as claimed in claim 4, wherein the support portion of the first annular spacer supports the tubular wall of the second annular spacer, and the stop of the first annular spacer is configured to receive and engage the tubular wall.

6. The encasing apparatus as claimed in claim 3, wherein the first annular spacer further comprises a fastening arrangement to allow fastening of the casing tube to the first annular spacer.

7. The encasing apparatus as claimed in claim 6, wherein the first annular space comprises a threaded shaft extending through the stop portion and the fastening arrangement comprises a loop attached to the casing tube and a screw, and in use the screw is screwed into the threaded shaft to engage with the meat stuffing horn and fasten the spacer in place, and the loop is placed over a top portion of the screw extending above the first annular spacer to fasten the casing tube to the first annular spacer.

8. The encasing apparatus as claimed in claim 3, wherein the portion of the meat stuffing horn that receives the casing tube has a constant diameter.

9. The encasing apparatus as claimed in claim 3, wherein the film is a collagen film.

10. The encasing apparatus as claimed in claim 3, wherein the net casing rests on the film casing.

11. The encasing apparatus as claimed in claim 3, further comprising the meat stuffing horn.

* * * * *